(12) United States Patent
Martin et al.

(10) Patent No.: US 11,620,107 B2
(45) Date of Patent: Apr. 4, 2023

(54) METHOD AND DEVICE FOR QUANTUM RANDOM NUMBER GENERATION

(71) Applicant: Université de Genève, Geneva (CH)

(72) Inventors: Anthony Christophe Mickaël Martin, Nice (FR); Nicolas Brunner, Geneva (CH); Hugo Zbinden, Geneva (CH); Jonatan Brask, Geneva (CH); Joseph Bowles, Barcelona (ES)

(73) Assignee: UNIVERSITÉ DE GENÈVE, Geneva (CH)

( * ) Notice: Subject to any disclaimer, the term of this patent is extended or adjusted under 35 U.S.C. 154(b) by 959 days.

(21) Appl. No.: 16/340,469

(22) PCT Filed: Oct. 6, 2017

(86) PCT No.: PCT/EP2017/075520
§ 371 (c)(1),
(2) Date: Apr. 9, 2019

(87) PCT Pub. No.: WO2018/065593
PCT Pub. Date: Apr. 12, 2018

(65) Prior Publication Data
US 2019/0243611 A1 Aug. 8, 2019

(30) Foreign Application Priority Data
Oct. 9, 2016 (EP) .................. 16192971

(51) Int. Cl.
*G06F 7/58* (2006.01)
*H04L 9/08* (2006.01)

(52) U.S. Cl.
CPC ............ *G06F 7/588* (2013.01); *H04L 9/08* (2013.01); *H04L 9/0852* (2013.01); *H04L 9/0861* (2013.01)

(58) Field of Classification Search
CPC ................. G06F 7/58–588; H04L 9/08–0897
See application file for complete search history.

(56) References Cited

U.S. PATENT DOCUMENTS 5,966,224 A * 10/1999 Hughes ............... H04L 9/0858
398/40
5,999,285 A * 12/1999 Brandt ................ H04L 9/0858
380/256

(Continued)

OTHER PUBLICATIONS

Lunghi et al. on "Self-Testing Quantum Random Number Generator" in Phys. Rev. Lett. 114, 150501. DOI:https://doi.org/10.1103/PhysRevLett.114.150501 (Year: 2015).*

(Continued)

*Primary Examiner* — Emily E Larocque
*Assistant Examiner* — Carlo Waje
(74) *Attorney, Agent, or Firm* — Thomas Coester Intellectual Property

(57) ABSTRACT

The invention is directed to a Quantum Random Number Generator comprising an emitting device (110) triggered by a signal representing an input bit x and adapted to generate and send a physical system (130) characterized by one of two possible quantum states determined by said input bit x, a measurement device (120) adapted to detect said physical system, to identify the quantum state of said physical system through an unambiguous state discrimination measurement and to generate an output b first representing whether the quantum state has been identified or not and, if it has been identified, which quantum state among the two possible quantum states was detected by the unambiguous state discrimination measurement to a processing device (140), the processing device (140) being adapted to estimate the entropy of the output b given the probabilities p(b|x) representing the probability of observing output b for a state preparation x, and a randomness extraction device (150)

(Continued)

(310) Non-orthogonal State preparation and sending sequence (320) USD Measurement sequence (330) Raw Random bit stream generation (340) Random bit stream extraction adapted to extract final random bit stream given the entropy estimate provided by the processing device (140).

12 Claims, 5 Drawing Sheets

(56) References Cited

U.S. PATENT DOCUMENTS

| | | | | |
|---|---|---|---|---|
| 2004/0139132 | A1* | 7/2004 | Lutkenhaus | G06F 7/588 |
| | | | | 708/250 |
| 2008/0147759 | A1* | 6/2008 | Fiorentino | B82Y 10/00 |
| | | | | 708/250 |
| 2015/0331672 | A1* | 11/2015 | Yuan | H04L 9/0852 |
| | | | | 359/107 |
| 2017/0010865 | A1* | 1/2017 | Sanguinetti | G06F 17/16 |

OTHER PUBLICATIONS

Huttner et al. on "Unambiguous quantum measurement of nonorthogonal states" in hys. Rev. A 54, 3783. DOI:https://doi.org/10.1103/PhysRevA.54.3783 (Year: 1996).*

Sanguinetti et al. on "Quantum Random Number Generation on a Mobile Phone" in Phys. Rev. X 4, 031056. DOI:https://doi.org/10.1103/PhysRevX.4.031056 (Year: 2014).*

Sun et al. on "Mathematical nature of and a family of lower bounds for the success probability of unambiguous discrimination" in Phys. Rev. A 65, 044306. DOI:https://doi.org/10.1103/PhysRevA.65.044306 (Year: 2001).*

Ma, X., Yuan, X., Cao, Z. et al. Quantum random number generation. npj Quantum Inf 2, 16021 (2016). https://doi.org/10.1038/npjqi.2016.21 (Year: 2016).*

Brask et al. on "MHz-rate semi-device-independent quantum random number generators based on unambiguous state discrimination" in Phys. Rev. Applied 7, 054018. DOI:https://doi.org/10.1103/PhysRevApplied.7.054018 (Year: 2017).*

Constantin, J., Houlmann, R., Preyss, N. et al. An FPGA-Based 4 Mbps Secret Key Distillation Engine for Quantum Key Distribution Systems. J Sign Process Syst 86, 1-15 (2017). https://doi.org/10.1007/s11265-015-1086-1 (Year: 2015).*

Han Yun-Guang et al: "More randomness from a prepare-and-measure scenario with independent devices" Arxiv.org, Cornell University Library, 201OLIN Library Cornell University Ithaca, NY 14853, Apr. 7, 2016 (Apr. 7, 2016).

Boris F Samsonov: "Optimal positive-operator-valued measures for unambiguous state discrimination", Arxiv.org, Cornell University Library, 201 Olin Library Cornell University Ithaca, NY 14853, Jun. 17, 2008 (Jun. 17, 2008).

Miguel Herrero-Collantes et al: "Quantum Random Number Generators", Arxiv.org, Cornell University Library, 201 Olin Library Cornell University Ithaca, NY 14853, Apr. 12, 2016 (Apr. 12, 2016).

Thomas Durt et al: "Fast quantum-optical random-number generators", Physical Review A (Atomic, Molecular, and Optical Physics), vo 1. 87, No. 2, Feb. 1, 2013 (Feb. 1, 2013).

Alejandro Mattar et al: "Optimal randomness generation from optical Bell experiments", New Journal of Physics, Institute of Physics Publishing, Bristol, GB, vo 1. 17, No. 2, Feb. 10, 2015 (Feb. 10, 2015).

Microphotondevices R L Micro Photon Device: "QRN Quantum Random Number Generator", Nov. 1, 2013 (Nov. 1, 2013), XP055362748,Retrieved from the Internet: URL:http://www.microphoton-devices.com/MPD/media/UserManuals/QRN UserManual.pdf [retrieved on Apr. 6, 2017].

* cited by examiner

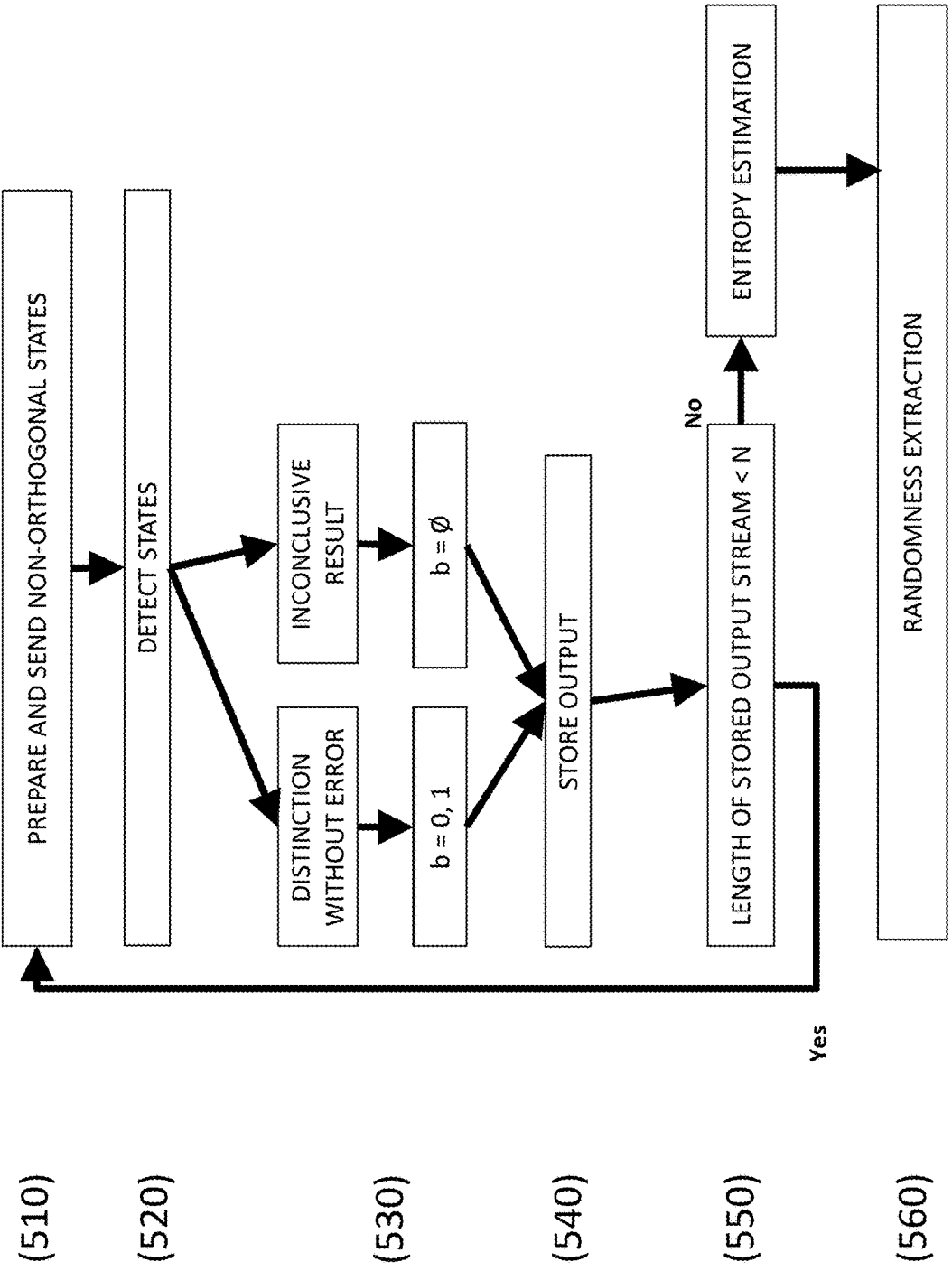

METHOD AND DEVICE FOR QUANTUM RANDOM NUMBER GENERATION

TECHNICAL FIELD

The present invention pertains to a device and method for generating quantum random numbers, which offers the possibility to precisely quantify the amount of entropy of a raw output stream due to the quantum nature of the process, and to generate via a randomness extraction procedure a final bit stream with entropy close to one per bit.

BACKGROUND OF THE ART

In general, the present invention is in the context of the generation of random numbers. Many tasks in modern science and technology make use of random numbers, including simulation, statistical sampling, gaming applications, and cryptography, both classical and quantum. A good random number generator should produce a chain of bits with high entropy at a high rate. By high entropy, it is meant that nobody can predict the value of the bit before the bit is revealed, entropy can also be understood as randomness. This is an essential requirement in most of the modern methods of data encryption. Indeed, all the cryptography protocols commonly employed, such as DSA-, RSA- and Diffie-Hellman-algorithms, follow Kerckhoffs' principle, which dates back to the 19th century, and states that the security of a cypher must reside entirely in the key, i.e. in the random sequence used as seed. It is therefore of particular importance that the key used in a cryptographic algorithm is secure, which in practice requires it to be chosen perfectly at random, i.e. randomly generated.

Currently, most random keys are generated by arithmetic approaches and are thus only pseudo-random. In this context, we recall the citation of John von Neumann in 1951: "Anyone who considers arithmetical methods of producing random digits is, of course, in a state of sin." This citation can give rise to laughter, but its relevance has been verified throughout history. Indeed, most recent breaches of cryptography protocols have exploited random-number-generator weaknesses, such as reported by A. K. Lenstra, and co-authors in their article "Ron was wrong, whit is right" in *Cryptology ePrint Archive*, 2012. Such attacks can happen in many different fields including operating system security (see the article "Cryptanalysis of the random number generator of the windows operating system" by L. Dorrendorf, Z. Gutterman, and B. Pinkas published in *ACM Trans. Inf. Syst. Secur.*, 13(1):1-32, 2009), communication protocols (see "openssl—predictable random number generator" by L. Bello published in *Debian security advisory* 1571-1, 2008), digital rights management (see the publication "Ps3 epic fail" by Bushing, Marcan, Segher, and Sven at the *27th Chaos Communication Congress*, 2010), and financial systems (see "Android bug batters bitcoin wallets" by R. Chirgwin in *The Register*, 2013).

Pseudo random number generation can be used advantageously for some applications such as numerical simulation, making results reproducible, but limitations need to be taken into account. For other applications, however, different methods need to be employed to avoid loopholes. For this reason, random number generators based on physical systems were developed, which in principle ensure the uniqueness and, most importantly, the randomness of the generated bit string. Example are given by C. H. Vincent in "The generation of truly random binary numbers", *Journal of Physics E: Scientific Instruments*, 3(8):594, 1970, orbyY. Saitoh, J. Hori, and T. Kiryu, in "Generation of physical random number using frequency-modulated oscillation circuit with shot noise", *Electron Comm. Jpn.* 3, 88(5):12-19, 2005. These types of random number generators use physical processes, which are ruled by deterministic laws but cannot be easily predicted due to the complexity and incomplete knowledge of the initial system state. We call this type of random number generators, chaotic random number generators. This random number generator type is now commonly used, notably it is implemented in Intel processors, see "Analysis of Intel's IVY bridge digital random number generator", by M. Hamburg, P. Kocher and M. E. Marson in *Cryptography research Inc*. Other examples of this kind of physical random number generators are disclosed in U.S. Pat. Nos. 6,831,980, 6,215,874, WO2013/003943, EP 1 821 196, WO01/95091. The security of these generators crucially relies on the fact that nobody has enough information to predict the behavior of the physical system or influence it.

Another implementation consists in using physical processes, which feature fundamental genuine randomness, such as quantum mechanical processes. This type of generators is called quantum random number generators (QRNGs). With this type of generator, a perfect knowledge of the system is in general insufficient to allow one to predict the bits that will be generated, as explained in more details in the article "Quantum random-number generation and key sharing" by J. G. Rarity, P. C. M. Owens, and P. R. Tapster, *J. Mod.Opt.*, 41(12):2435-2444, 1994. Known QRNGs are based on specialized hardware, such as single-photon sources and detectors as described by A. Stefanov, N. Gisin, O. Guinnard, L. Guinnard, and H. Zbinden in their article "Optical quantum random number generator", *J. Mod. Opt.*, 47(4), 595-598, 2000, photon pair sources in combination with beam splitters such as disclosed by W. Dultz and E. Hildebrandt in their U.S. Pat. No. 6,393,448, 2002 entitled "Optical random-number generator based on single-photon statistics at the optical beam splitter", the device proposed by W. Wei and H. Guo in the article "Bias-free true random-number generator", *Opt. Letters*, 34(12):1876-1878, 2009, or homodyne detection as proposed for example by C. Gabriel, and co-authors in "A generator for unique quantum random numbers based on vacuum states", *Nature Phot.*, 4(10):711-715, 2010. Other examples of such kind of physical random number generators are disclosed in U.S. Pat. No. 7,284,024, US 2012/045053, JP 2009/070009, EP 2 592 547, GB 2 473 078, and WO02/091147. However, while these quantum random number generators can, in theory, generate perfect randomness and therefore high entropy; in practice, their implementation is prone to loopholes due to unavoidable technical imperfections of the devices that inherently generate technical noise. In this configuration, the main difficulty consists in estimating the entropy generated by a quantum process, and separating it from the entropy due to technical noise (such as thermal noise or the like). This requires a precise theoretical modeling of the device, which is usually difficult to establish and analyze because modeling is inherently based on theoretical assumptions in the equations, which are not exactly representing the reality. A further limitation comes from the fact that the properties of the device may change during its lifetime. In particular, if the device malfunctions, or even breaks, low quality randomness is generated without the user being aware of it. Therefore, it may be valuable to have a real-time evaluation of the entropy contained in bit streams provided by QRNGs.

Recently, to overcome this issue, the concept of a self-testing quantum random generator was introduced, as discussed in references "Self-Testing Quantum Random Number Generator" T. Lunghi, and co-authors, *Phys. Rev. Lett.* 114, 150501, 2015, and "Source-device-independent Ultrafast Quantum Random Number Generation", D. G. Marangon, G. Vallone, and P. Villoresi, ePrintarXiv 1509.07390, 2015. With this approach, the user can quantify the generation of genuine quantum random numbers in real-time. Specifically, the amount of quantum entropy generated by the system can be estimated directly from the observed data. In this way, genuine quantum entropy can be separated from entropy due to technical imperfections of the device or malfunctioning due to aging. However, in practice this approach involves complex setups, including electro-optical modulators with multiple state preparation and single photon detectors. Moreover, only low rates in the range of few bits per seconds may be achieved (e.g.: 23 bps in the case of Lungi et al. publication) which suggests limited interest from applications requiring throughput in the range of Mbps (such as cryptography, security, gaming and scientific simulation).

It is therefore an object of the present invention to provide an apparatus and a method precisely quantifying the amount of entropy having a quantum nature in the output thereby a realizing a self-testing quantum random number generator at a high rate and preferably not involving a complex setup.

SUMMARY OF THE INVENTION

The present invention proposes a practical and efficient approach for realizing a self-testing random number generator based on unambiguous quantum state discrimination. This approach offers several advantages over existing implementations.

Most notably, the present approach offers ease of implementation, as it only requires standard components that may be implemented in a standalone device, thus providing an integrated system that is far less complex than the existing ones, and having a reduced size and cost. This approach offers also high bit rates in the range of few Mbit/s, sufficient for many applications based on random numbers. Finally, yet importantly, the random bit entropy is computed/monitored in real-time at the contrary of all previous solutions where random bit entropy is estimated during the QRNG conception. This approach features a broad scope of applicability.

For this reason a first aspect of the invention is directed to a Quantum Random Number Generator comprising an emitting device triggered by a signal representing an input bit x and adapted to generate and send a physical system characterized by one of two possible non-orthogonal quantum states determined by said input bit x, a measurement device adapted to detect said physical system, to identify the quantum state of said physical system through an unambiguous state discrimination measurement and to generate an output b first representing whether the quantum state has been identified or not and, if it has been identified, which quantum state among the two possible quantum states was detected by the unambiguous state discrimination measurement to a processing device, the processing device being adapted to estimate the probabilities p(b|x) representing the probability of observing output b for a state preparation x and estimating the entropy $H_{min}^Q$ of the output b based on the probabilities p(b|x), and a randomness extraction device providing the final random output stream by applying an adapted randomness extraction procedure based on the entropy estimate given by the processing device.

Advantageously, the physical system consists of photons, and the state of the physical system is encoded in the temporal mode of these photons. Alternatively, the state of the system can also be encoded using other degrees of freedom of the photons, such as the polarization, the spatial mode, the path degree of freedom, the frequency mode, or any combination of these degrees of freedom.

Preferably, the output b=0 if the first quantum state is detected, b=1 if the second quantum state is detected, and b=Ø if the measurement is inconclusive. Therefore, the output of the USD measurement is easy to use.

Advantageously, the Quantum Random Number Generator further comprises a triggering device generating the signal representing the input bit x to control the emitting device. Thus, it is easy to use.

According to a preferred embodiment of the invention, the triggering device is a FPGA generating electrical pulses representing an input bit for state preparation x.

Preferably, the processing device contains the triggering device. This permits to have a compact device.

Advantageously, the triggering device generates electrical pulses at 50 MHz, the emitting device is a pulsed laser emitting at 655 nm, and the measurement device is a single photon detector and further comprises a VOA.

Preferably, the randomness extraction device is adapted to carry out a randomness extraction procedure, based on the entropy estimate provided by the processing device, in order to generate a final bit stream of with entropy close to one per bit. This procedure allows one to enhance randomness by transforming the raw output bit stream of the measurement device, with estimated entropy $H_{min}^Q$, into a final bit stream, generally shorter than the raw bit stream, but with an entropy close to 1 per bit.

A second aspect of the invention is a Quantum Key Distribution System comprising at least one Quantum Random Number Generator according to the first aspect of the invention.

A third aspect of the invention is a self-testing method carried out by a Quantum Random Number Generator comprising the steps of preparing and sending a physical system in one of several predetermined non-orthogonal quantum states, detecting and measuring the sent quantum system through an unambiguous state discrimination measurement, providing an output b if the quantum state has been identified without error or a second value if the quantum state could not be identified, storing the output b, and when the length of the stored outputs is over a predetermined value N, estimating the probabilities p(b|x) and the entropy $H_{min}^Q$ of the output b, and extracting the final random bit stream via a randomness extraction procedure.

Preferably, when the length of the random bits is not over a predetermined value N, the method goes back to the preparing and sending step.

BRIEF DESCRIPTION OF THE DRAWINGS

The attached figures illustrate the principles as well as several realizations of the present invention.

FIG. 5 is a detailed method steps associated to the apparatus of the present invention.

DESCRIPTION OF THE PREFERRED
EMBODIMENT OF THE INVENTION

Figure 1:
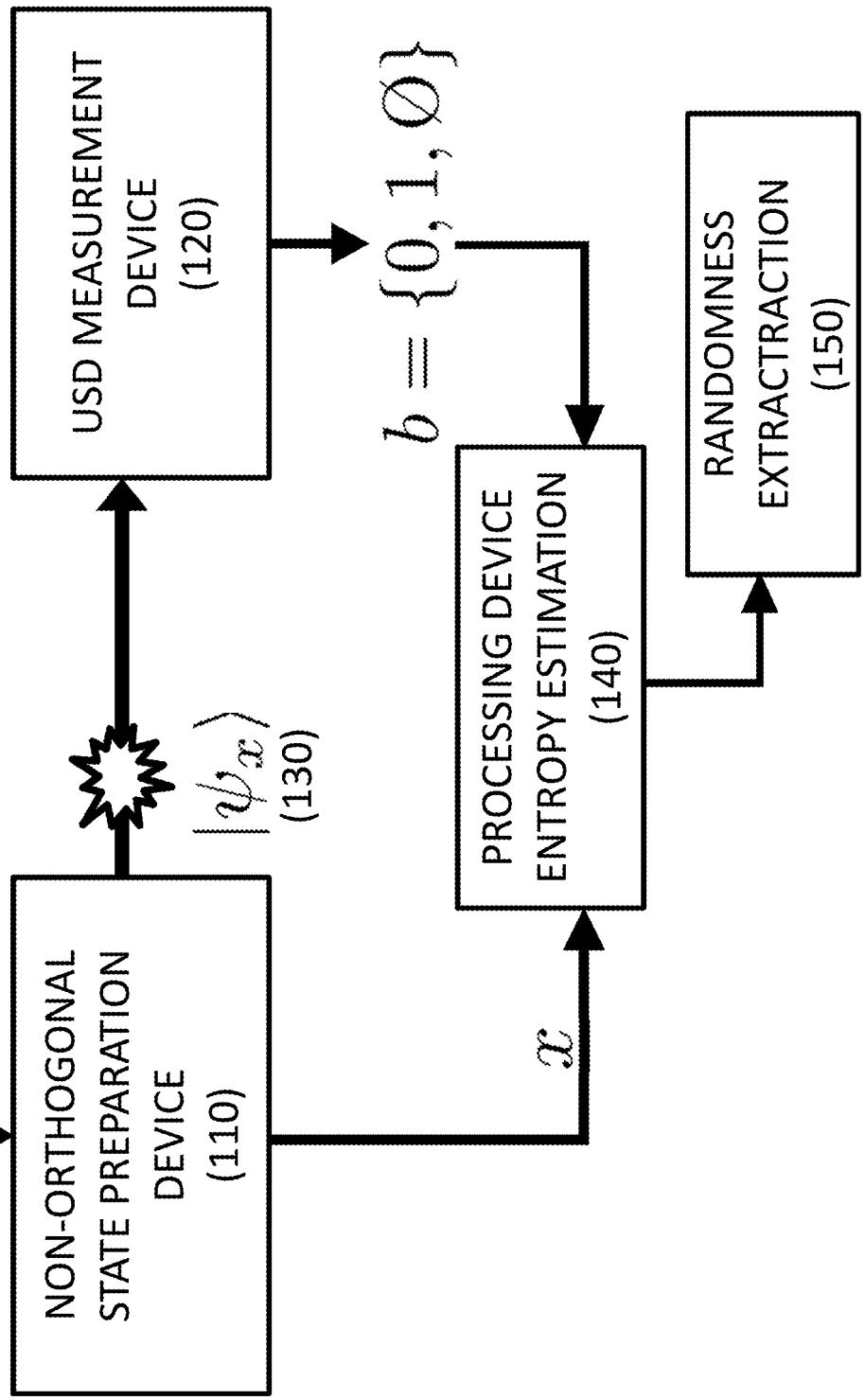
FIG. 1 is a schematic representation of the general concept and protocol; relating to the apparatus and the method of the present invention.
Figure 3:
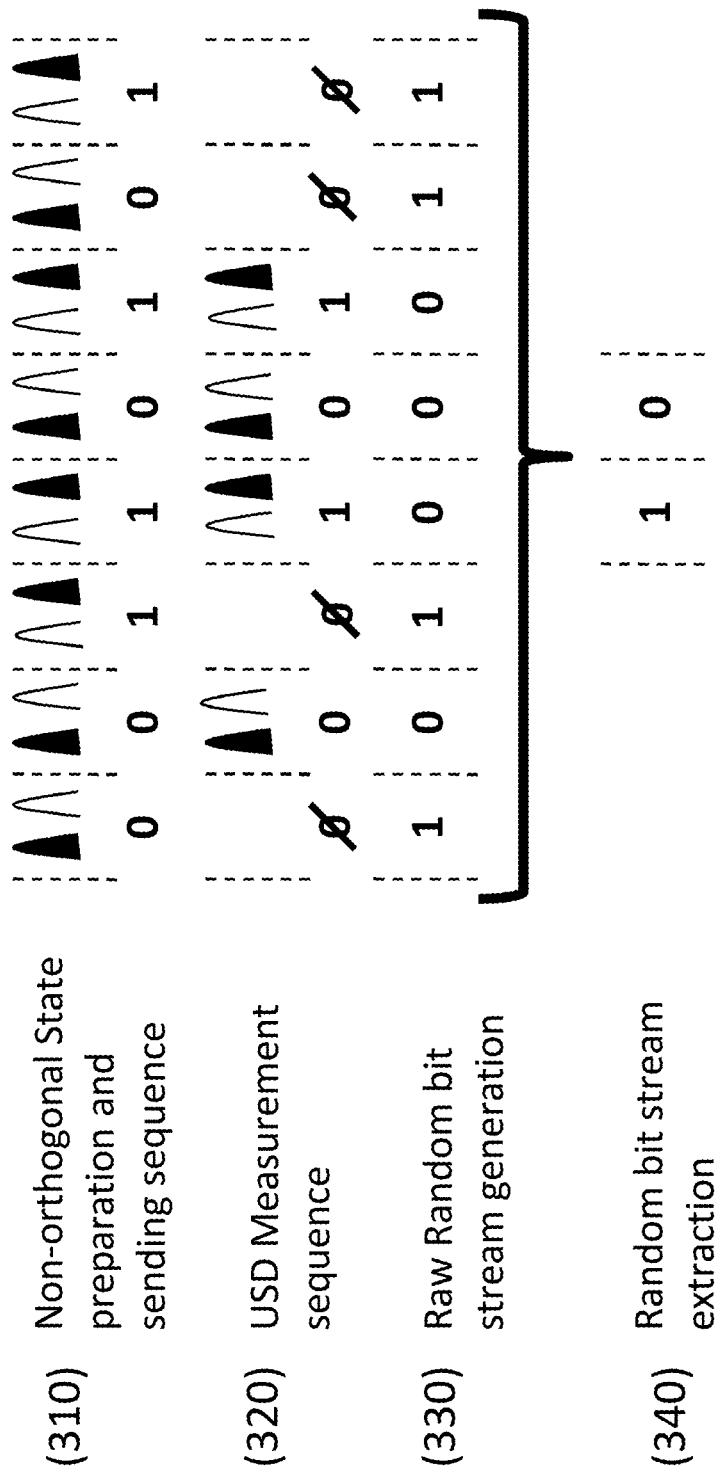
FIG. 3 is a general overview of a protocol associated to the apparatus of the present invention.
Figure 4:
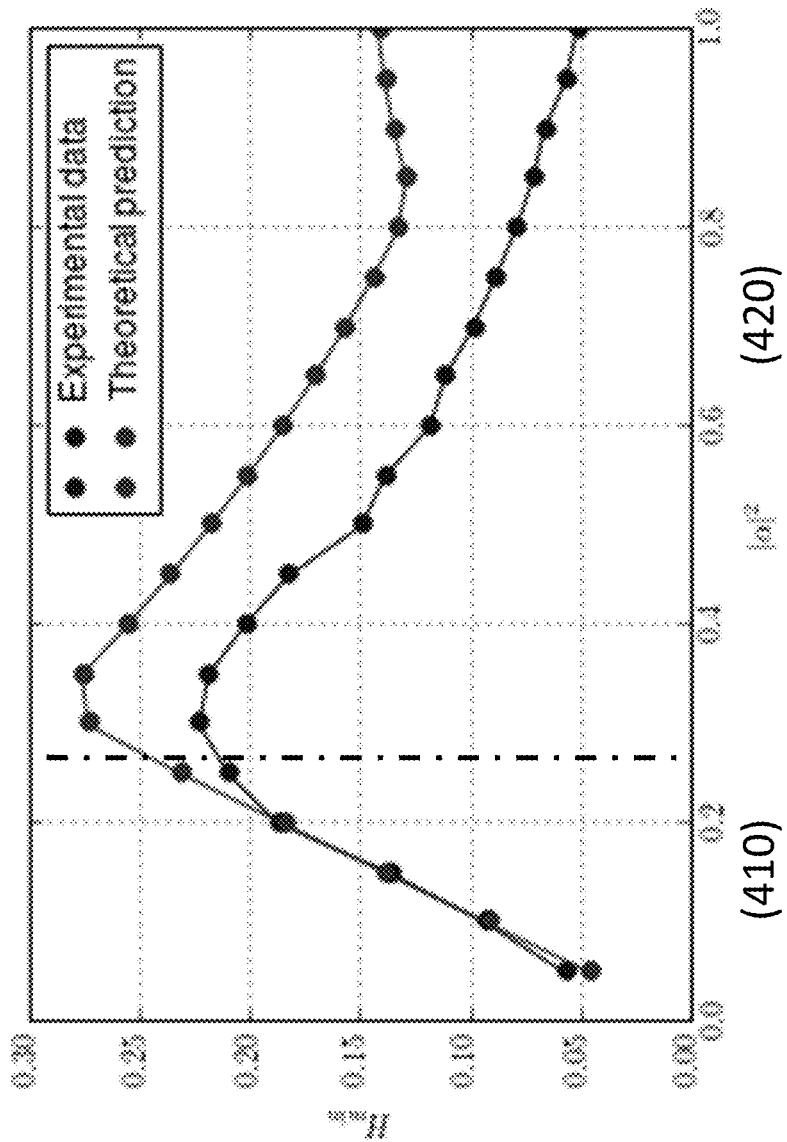
FIG. 4 is a plot graph representing an experiment and theoretical prediction based on time-bin set-up.

In the following, the invention is described in details with reference to the above-mentioned figures. FIG. 1 schematically represents the description of the principle while FIG. 2 treats a specific implementation of the approach. FIG. 3 is a general overview of the protocol and FIG. 4 presents the results obtained with the specific implementation of the random number generator. FIG. 5 is a detailed description of the method associated to the apparatus.

FIG. 1 schematically illustrates the principle of the quantum random number generator and its conceptual scheme where a source 110 prepares a physical system (130) in one of two (or possibly more) possible non-orthogonal quantum states according to an input bit x, and sends it to the measurement device 120. The measurement device 120 performs an unambiguous state discrimination (USD) measurement, and gives an output b. The output b is either conclusive, indicating which state was prepared by the source, or inconclusive if it does not succeed to discriminate between the two possible states.

More precisely, the setup comprises two devices. The first and the second devices are referred to as the "non-orthogonal state preparation device" 110 and "USD measurement device" 120, respectively. The "non-orthogonal state preparation device" 110 sends a physical system, prepared in one out of two possible quantum states, to the "USD measurement device" 120. The "USD measurement device" 120 attempts to identify which state was sent. Thus, it implements a quantum measurement able to distinguish between the two quantum states. The scheme can be viewed as a setup for unambiguous quantum state discrimination, where the goal is to identify which state is being sent with as little error as possible. Importantly, if the two states are non-orthogonal, i.e. with a non-zero overlap, it is impossible, according to the laws of quantum theory, to continuously discriminate them with certainty. Nevertheless, probabilistically it is possible to perfectly discriminate them. This means that it is possible to distinguish them without error, i.e. the measurement device never outputs 'b=1' when the state was 'x=0' and vice versa, at the price of sometimes outputting an inconclusive result 'b=Ø'. The crucial point is now the following: it is impossible to predict in advance whether a particular round of the experiment, i.e. detection of a quantum state, will be conclusive or inconclusive. Therefore, randomness can be extracted from the experimental data. For instance, one can consider that conclusive runs and inconclusive runs represent output bit values 0, and 1, respectively.

Moreover, the entropy of the output bits can be precisely quantified by verifying that the measurement distinguishes the two states without error. Therefore, based on a promise on how non-orthogonal the states are (i.e. what their overlap is), it is possible to estimate the entropy contained in the output data in real time 140, as explained below in more details. Then, based on this entropy estimate, a final string of random bits can be generated via an adapted procedure of randomness extraction 150. By doing this, a constant amount of entropy is guaranteed. Importantly it is not necessary to have a precise characterization of the states themselves, or of the functioning of the "non-orthogonal state preparation device" 110 and "USD measurement device" 120.

Figure 2:
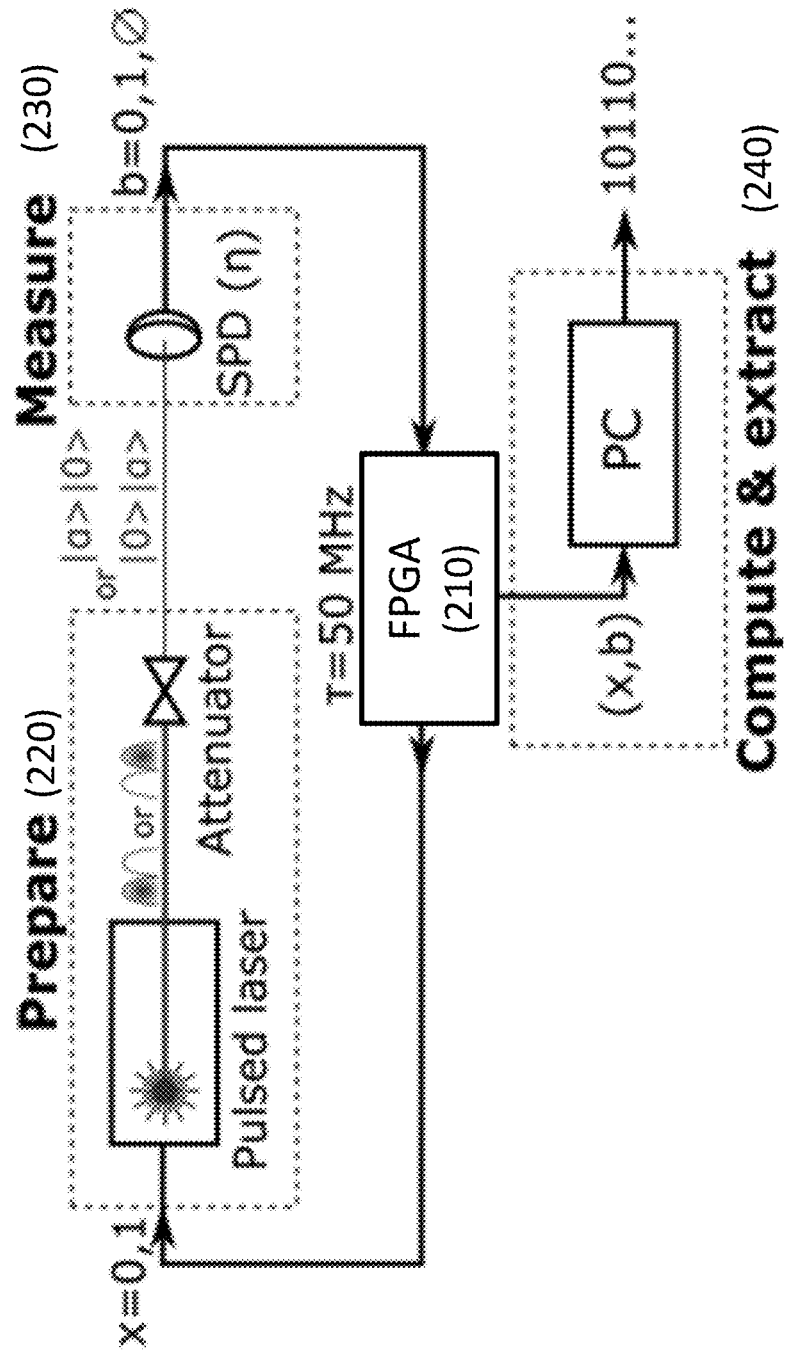
FIG. 2 is an exemplary embodiment of the present invention.

FIG. 2 schematically illustrates the experimental setup realized to test the random number generator. For the implementation, different types of physical systems may be used to encode the states, such as the energy levels of atomic mediums, the spin of electrons, or various degrees of freedom of photons. In the realized experimental set-up, the two states are encoded with two weak coherent states of light emitted in two different time-bins.

In the present case, the photon number basis (so-called Fock basis) a coherent state α is defined by:

$$|\alpha\rangle = \sum_{n=0}^{\infty} \sqrt{P_n} \, |n\rangle. \qquad (1)$$

In a coherent state having a Poissonian distribution, the probability to find n photons is given by:

$$P_n = \frac{\alpha^n}{n!} e^{-|\alpha|^2}. \qquad (2)$$

To generate the two states, the source emits a coherent state at a time $t_0$ or $t_1$, which corresponds to states of the form:

$$|\psi_0\rangle = |\alpha\rangle_{t_0} |0\rangle_{t_1} = \sqrt{P_0} \, |0\rangle_{t_0} |0\rangle_{t_1} + \sum_{n=1}^{\infty} \sqrt{P_n} \, |n\rangle_{t_0} |0\rangle_{t_1}, \qquad (3)$$

$$|\psi_1\rangle = |0\rangle_{t_0} |\alpha\rangle_{t_1} = \sqrt{P_0} \, |0\rangle_{t_0} |0\rangle_{t_1} + \sum_{n=1}^{\infty} \sqrt{P_n} \, |0\rangle_{t_0} |n\rangle_{t_1}.$$

This yields a direct relation between the overlap δ and the mean number of photons per pulse:

$$\delta = \langle \psi_0 | \psi_1 \rangle = P_0 = e^{-|\alpha|^2} \qquad (4)$$

So, by setting the intensity of the coherent state, the overlap between the two states is adjusted.

FIG. 2 provides a simplified diagram of the experimental set-up based on a first device 220, also called Prepare device, (which corresponds to the non-orthogonal state preparation device 110), a second device 230, also called Measure device, (which corresponds to the USD measurement device 120), a Field-programmable gate array (FPGA) 210 and a Computer 240 (corresponding to the Processing device 140 and randomness extractor device 150). If a click, here a detection, is registered at time $t_0$ ($t_1$), the measurement device outputs b=0 (b=1), while if no click is registered, the outcome is inconclusive b=Ø. In absence of imperfections, this realizes perfect unambiguous state discrimination. In practice, errors in the implementation of the QRNG, including limited detector efficiency, dark-count, and dead-time, reduce the quantum entropy.

Experimentally, a Field-programmable gate array (FPGA) 210 sets at a rate of 50 MHz, for example. At each clock pulse, the FPGA 210 generates a random bit x to choose if the pulse is emitted at the time $t_0$(x=0) or $t_1$ (x=1) which correspond to a state preparation x and records the associated answer of the detector. The probabilities p(b|x) are calculated, for example, after one second of measurement to have enough statistics to estimate the entropy of the output b.

More precisely, for example, the FPGA 210 generates the input x and sends an electrical pulses at a rate of 50 MHz When x=1 (similarly, when x=0) the electrical pulse is at the beginning (similarly, at the end) of the gate, if the implementation based on time-bin is used. These electrical impulsions are used to trigger the prepare device 220 composed of a pulsed laser at 655 nm, for example, and a variable optical attenuator (VOA). The optical pulses generated by the Pulsed laser pass-through the VOA in order to adjust the optical intensity per pulse. In this way, the overlap between the two time-bin states is adjusted. The measurement device 230 is constituted by a single photon detector (SPD) which sends the detection events to the FPGA 210 with three output values: Early (b=0), Late (b=1), or no-click (b=Ø). The processing device records x and b in every round. After a predetermined number of rounds N, for example every second, the FPGA 210 computes the probabilities p(b|x) and estimates the entropy $H_{min}^Q$ of the raw output b. With all these information, the randomness extraction device 240 is able to perform the randomness extraction procedure, and generates a final perfectly random bit string.

In FIG. 3, the protocol is described in more detail. Starting with the preparation device, upon receiving input x, the "non-orthogonal state preparation device" 110 emits a physical system prepared in a quantum state $|\psi_x\rangle$. This quantum state refers to one degree of freedom of the emitted system. For instance, $|\psi_x\rangle$ may represent the temporal mode of photons. Then, if the choice of preparation is binary (i.e. x=0 or x=1), the "non-orthogonal state preparation device" 110 emits either the state $|\psi_0\rangle$ (if x=0), or $|\psi_1\rangle$ (if x=1). Note however that other degrees of freedom can be considered, such as the polarization of photons. Importantly, the states are assumed to be non-orthogonal (i.e. not perfectly distinguishable), such that their overlap δ is bounded by $|\langle \psi_0|\psi_1\rangle| \geq \delta$. Therefore, the first step 310 of the protocol consists in generating a sequence of non-orthogonal states via the "non-orthogonal state preparation device" 110.

Since the two possible states generated by the "non-orthogonal state preparation device" 110 have an overlap, it is impossible (according to the laws of quantum physics) to perfectly distinguish them. That is, no quantum measurement can continuously tell which state has been sent without making any errors. However, quantum theory allows probabilistic measurements without error, more precisely the measurement apparatus only answer when the measurement is conclusive. Such measurements are referred to as measurements performing "unambiguous quantum state discrimination" (USD).

Therefore, the second step of the protocol 320 consists in realizing USD measurement. In the presented scheme, the "USD measurement device" 120 implements a USD measurement. Specifically, the device returns a ternary output b; output b=0 or b=1 indicates that the emitted state was state 0 or state 1 (in other words the result is conclusive), while b=Ø represents an inconclusive result (one cannot determine which state has been sent). The proposed approach works also for non-ideal USD measurements, as in this case, quantum theory predicts that the observed statistics of the experiment, i.e. the probabilities p(b|x) of observing output b for a state preparation x are given by p(0|0)=p(1|1)=1−δ for the conclusive events, while for inconclusive ones we have p(Ø|0)=p(Ø|1)=δ. Note that, assuming perfect USD, there are no errors, i.e. p(0|1)=p(1|0)=0. As the occurrence of inconclusive events is unpredictable, the above statistics clearly contains genuine quantum randomness.

Randomness and entropy are quantified in further steps 330 and 340. In order to do so, an output bit c can be defined, which indicates whether the measurement was conclusive or not, i.e. c=0 when b=0 or 1, and c=1 when b=Ø. Furthermore, the randomness in the bit c needs to be quantified given an overlap of the prepared quantum states δ. The randomness is quantified by the guessing probability $p_g$ for any observer knowing the input x, and with potentially complete knowledge of the inner workings of the devices. One finds that $p_g \leq \delta$, which captures the fact that inconclusive events cannot be predicted by any observer. In particular, for δ=½, a perfectly random bit is generated. More generally, one may find that the statistic contains only partial randomness, i.e. $p_g < ½$. In practice, the guessing probability $p_g$ can be upper bounded from the probabilities p(b|x) using the inequality: $p_g \leq \Sigma_{x,b} v_{x,b} p(b|x) + \gamma$, where the parameter $v_{xb}$ and γ are obtained via an adapted semi-definite program (SDP). From the value of $p_g$, the quantum entropy contained in the data may be estimated and is given by the min-entropy:

$$H_{min}^Q = -\log_2(p_g). \quad (5)$$

This estimation of the entropy allows one to apply an adapted randomness extraction procedure, which then leads to the final list of random bits in a last step 340 with an entropy per bit close to 1.

FIG. 4 shows the min-entropy obtained with the experimental realization of the quantum random number generator showed in FIG. 2 and plotted through the blue curve. The min-entropy is given as a function of the intensity per pulse $|\alpha|^2$, which is directly related to the overlap between the two quantum states. The red curve corresponds to a theoretical prediction for a detection efficiency of 60%. In the set-up presented in FIG. 2 the difference between the experimental data and the theoretical prediction is due to the imperfections of the detectors such as dark-counts and dead time.

In order to characterize the entropy generated by the device as a function of the overlap δ, the measurement has been performed for a set of $|\alpha|^2$ in the range of 0.05 to 1 with a 0.05 step. The obtained results are shown in FIG. 4 where two areas may be distinguished 410 and 420. Due to the efficiency of the detector, around 60%, the maximal min entropy of 0.22 is obtained for $|\alpha|^2=0.3$ (represented by the maximum of the blue curve). The curve in red in FIG. 4 represents the entropy expected for a detector with an efficiency of 60% but without taking into account the noise and the dead-time. As expected, all the imperfection of the detector reduces the entropy, which appears in the area 420 and is mainly due to the dead-time of the detector, which is around 50 ns.

With the information of the quantum entropy generated by the device, a randomness extractor may be implemented to generate from the raw data (alternatively referred to as the raw key), i.e. the bit chain of detections '1' and not-detections '0', an extracted stream of bits with an entropy close to 1. For a min-entropy of 0.22, perfectly random bits may be extracted at a rate of 11 Mbps.

FIG. 5 is a detailed description of the method associated to the invention apparatus presented in FIG. 2. The first step 510 consists in preparing and sending one out of two possible non-orthogonal states, this is done by the "non-orthogonal state preparation device" 110 that emits a physical system prepared in one out of two possible non-orthogonal quantum states $|\psi_x\rangle$. This quantum state refers to one degree of freedom of the emitted system. For instance, $|\psi_x\rangle$ may represent the state of polarization of photons or a temporal mode of photons. In a second step 520, the quantum state sent is detected and measured by the "USD measurement device" 120 that implements a USD measurement. In a third step 530, the state is measured and, the "USD measurement device" 120 returns a ternary output b; output b=0 or b=1 indicates that the emitted state was state 0 or state 1 (in other words the result is conclusive), while b=∅ represents an inconclusive result (one cannot say which state has been sent). Therefore, in this third step 530, either the "USD measurement device" 120 outputs a conclusive or an inconclusive result. Therefore, once the state is detected and measured by the "USD measurement device" 120, the value of the output bit stored and the detection is counted as an event and added to the statistics in a further step 540. The stored output is added to the output stream. If output stream size is bigger than N, with N being an output stream size with sufficient statistical events (typically in the range of 10 Mbit) then the apparatus proceeds with the entropy estimation 550 and randomness extraction process 560. Otherwise, another input bit x is generated and the corresponding state is prepared and sent by the "non-orthogonal state preparation device" 110 and another 510 to 540 step cycle is achieved. The last step 560 consists in randomness extraction procedure, which provides a final random output bit stream with entropy close to one for each bit.

The invention claimed is:

1. Quantum Random Number Generator comprising:
   an emitting device (110) triggered by a signal representing an input bit x and adapted to generate and send one of two possible non-orthogonal quantum states (130) determined by said input bit x,
   a measurement device (120) adapted to detect said quantum state, to identify said quantum state through an unambiguous state discrimination measurement, and to generate an output b first representing whether the quantum state has been identified or not and, if the quantum state has been identified, which quantum state among the two possible quantum states was detected by the unambiguous state discrimination measurement to a processing device (210),
   the processing device (210) adapted to record the input x and the output b over a certain number of rounds N, and then determining probabilities p(b|x) representing a probability of observing output b given input x, and finally estimating an entropy $H_{min}^Q$ of the output b, and
   a randomness extraction device (240) adapted to generate a raw key of length N, wherein a raw key bit is 0 when a corresponding output b is conclusive and 1 when the corresponding output b is inconclusive, and to generate from this raw key a final random output bit string r via a randomness extractor protocol based on the entropy estimate $H_{min}^Q$ provided by the processing device.

2. Quantum Random Number Generator according to claim 1, characterized in that the two possible non-orthogonal quantum states are encoded in a temporal mode of photons.

3. Quantum Random Number Generator according to claim 1, characterized in that the two possible non-orthogonal quantum states are encoded in a polarization of photons.

4. Quantum Random Number Generator according to claim 1, characterized in that the two possible non-orthogonal quantum states are encoded in a frequency mode of photons.

5. Quantum Random Number Generator according to claim 1, characterized in that the two possible non-orthogonal quantum states are encoded in a photon number degree of freedom of light.

6. Quantum Random Number Generator according to claim 1, characterized in that the two possible non-orthogonal quantum states are encoded in a spatial mode of photons.

7. Quantum Random Number Generator according to claim 1, characterized in that the two possible non-orthogonal quantum states are encoded in a path degree of freedom of photons.

8. Quantum Random Number Generator according to claim 1, characterized in that the two possible non-orthogonal quantum states are encoded using a combination of two or more encodings of a temporal mode of photons, a polarization of photons, a frequency mode of photons, a photon number degree of freedom of light, a spatial mode of photons and a path degree of freedom of photons.

9. Quantum Random Number Generator according to claim 1, characterized in that the entropy estimation is made according to $H_{min}^Q = -\log_2(p_g)$, where the guessing probability $p_g$ can be upper bounded from the probabilities p(b|x) as follows: $p_g \leq \Sigma_{x,b} v_{x,b} p(b|x) + \gamma$, where the parameter $v_{x,b}$ and $\gamma$ are obtained via an adapted semi-definite program (SDP).

10. Quantum Random Number Generator according to claim 1, characterized in that the randomness extractor protocol is realized by a vector-matrix multiplication between a vector formed by a raw bit value generated at the output of the unambiguous quantum state discrimination measurement device and a random matrix M where the dimension is adapted as a function of the quantity of entropy $H_{min}^Q$ estimated (140).

11. Quantum Key Distribution System comprising at least one Quantum Random Number Generator of claim 1.

12. Quantum Random Number Generator comprising:
   an emitting device (110) adapted to be triggered by a signal representing an input bit x and adapted to generate and send one of more than two possible non-orthogonal quantum states (130) determined by said input bit x,
   a measurement device (120) adapted to detect said quantum state, to identify said quantum state through an unambiguous state discrimination measurement, and to generate an output b first representing whether the quantum state has been identified or not and, if it has been identified, which quantum state among the more than two possible quantum states was detected by the unambiguous state discrimination measurement to a processing device (210),
   the processing device (210) adapted to record the input x and the output b over a certain number of rounds N, and then determining probabilities p(b|x) representing the probability of observing output b given input x, and finally estimating an entropy $H_{min}^Q$ of the output b, and
   a randomness extraction device (240) adapted to generate a raw key of size N, wherein a raw key bit is 0 when corresponding output b is conclusive and 1 when the output b is inconclusive and to generate from this raw key a final random output bit string r via a randomness extractor protocol based on the entropy estimate $H_{min}^Q$ provided by the processing device.

* * * * *